June 10, 1969

F. M. WOOD

3,449,662

MAGNETIC INSPECTION METHOD AND APPARATUS USING RESILIENT
MAGNETIZING MEANS AND RESILIENT SENSORS

Filed Oct. 16, 1963

Fenton M. Wood
INVENTOR.

BY Arnold, Roylance & Harris

ATTORNEYS

Fenton M. Wood
INVENTOR.

BY Arnold, Roylance & Harris

ATTORNEYS

Fenton M. Wood
INVENTOR.

United States Patent Office 3,449,662
Patented June 10, 1969

3,449,662
MAGNETIC INSPECTION METHOD AND APPARATUS USING RESILIENT MAGNETIZING MEANS AND RESILIENT SENSORS
Fenton M. Wood, Sugarland, Tex., assignor to American Machine & Foundry Co., New York, N.Y., a corporation of New Jersey
Filed Oct. 16, 1963, Ser. No. 316,630
The portion of the term of the patent subsequent to Dec. 21, 1982, has been disclaimed
Int. Cl. G01r 33/12
U.S. Cl. 324—37    18 Claims This invention relates to an apparatus for testing tubular metallic goods, such as oil well pipe, tubing or casing for defects. More particularly, the invention relates to an improved apparatus for inspecting tubular goods and in which there is provided a novel search unit having a resilient annular body member with a conductive coil of an extensible and resilient material embedded around the periphery thereof. The invention also relates to an apparatus for inspecting tubular goods and in which there is provided a novel magnetizing means in the form of a resilient annular ferromagnetic member for relative movement through the pipe and for establishing a magnetic field through substantially the full circumference of a section of the pipe being inspected with a minimum air gap therebetween. The invention also relates to a method of magnetically inspecting buried ferromagnetic pipe, detecting defects, and providing the pipe with a magnetic pole point at the point of defect, which pole point can subsequently be detected from above grounds by a magnetic-responsive means passed therealong.

In the magnetic inspection art, there has long been a need for an apparatus which could be passed along in very close proximity to the surface of the member being inspected and to thereby detect variations in the magnetic field as indications of defects in the member. Thus by reducing the air gap between the inspecting unit and the tubular member, defects can be detected with greater accuracy. For example, when inspecting pipe or pipelines from the inside, the search unit must be of a size so as to pass through the pipe without becoming lodged by mashes or minor obstructions such as bumps, protrusions, turns or the like.

Ideally, for maximum sensitivity, the inspection unit or detection device should be only a few thousandths of an inch off the surface of the pipe to get maximum resolution of indications of small flaws. In the case of inspecting pipe from the inside, the ratio of the size of the search coil to the size of the internal diameter of the pipe is sometimes referred to as the "fill factor," as is explained on pp. 36.16 and 36.17 of Nondestructive Testing Handbook, edited by Robert C. McMaster, The Ronald Press Company, New York, 1959. As the size of the coil is reduced in relation to size of the pipe, i.e., the distance between coil sides and wall, sensitivity and resolution of the inspection equipment in detecting defects is reduced drastically.

Hence, the prior art has utilized wire coils which were rigid, thus necessitating a wide air gap between the coil and the pipe so that the test instrument would not become lodged in the pipe. Examples of such devices are shown in FIG. 22, p. 38–25 Nondestructive Testing Handbook, cited above and U.S. Patent No. 3,091,733. Thus, these devices are not nearly as sensitive to small defects as is desirable.

Other prior art devices have attempted to overcome the problem by the use of rigid wire coils in certain rubber members, but such devices were only adapted to certain limited and specified uses and/or the wire coils quickly become fatigued when subjected to repeated distortions and deformations as would occur when passing through a pipeline, thus quickly failing.

The present invention overcomes the foregoing problems by providing a resilient search unit having an annular body member of electrically non-conductive, non-magnetic, elastomeric material shaped to resiliently contact the surface of the pipe being inspected. Attached to that body member, and preferably embedded just under the annular surface (either inside or outside) thereof is one or more electrically conductive search coils of extensible and resilient material, connected to electrical indicating means. When the search unit is passed along closely adjacent the tubular member being inspected, and a magnetic field has been established in the pipe, then voltages will be induced in the search coils as they pass through flux leakages created by flaws and pits in the pipe. Since the body member is resilient, and since the coils are extensible and resilient, the search unit may be subjected to repeated deformation without fatiguing and malfunctioning. Moreover, the coils will be continuously kept in very close proximity to the surface of the pipe, thereby reducing to a very minimum the air gap therebetween.

Another problem which has plagued the industry and which is closely related to the foregoing problem is the method of establishing a magnetic field in the pipe being inspected. When inspecting pipe from the inside, for example, it has been difficult to establish a suitable magnetic field with a minimum power requirement. One method has been to establish a plurality of magnetic fields in a section of pipe, in order to cover the full circumference. However, with this approach, there is much diffusion of flux, thus requiring more power to saturate the portion of the pipe being inspected.

Moreover, if substantially the full circumference of the pipe wall is provided with one longitudinal magnetic field by the use of a rigid magnetizing means of the prior art, then there would be a large air gap between the magnetizing means and the pipe wall in order to avoid lodging of the magnetizing means on a minor obstruction in the pipe. This air gap in the flux path results in fairly large power requirements for the magnet in order to magnetize the pipe section being inspected to the desired degree.

The present invention overcomes the foregoing problems by providing a magnetizing means having one or more annular resilient ferromagnetic members mounted on a central core for slidably and resiliently engaging and conducting magnetism to and from substantially the full circumference of the pipe wall as the magnetizing means is moved relatively through a pipe. Thus, the diffusion of the flux in the transverse direction is largely eliminated and the air gap is reduced to a minimum. Hence, less power is required to inspect a given section of pipe than has heretofore been possible.

In many instances, when a defect above a certain level is detected in a pipe, as for example in a buried pipeline, it is desirable to be able to physically locate that defect so it may be repaired. Thus, if the defect is detected and recorded on a recording means, it is often difficult to correlate that indication on the recording means with the actual physical location. The present invention also provides the solution to this problem by providing an apparatus which can pass through the pipeline, detect the defect, and to mark that defect by placing a strong, easily locatable magnetic pole point in the pipe itself. This pole point is established by reversing the magnetic polarity of the magnet used to inspect for defects. This magnetic pole point can thereafter be easily detected by the use of the magnetic-responsive means, such as magnetometers, which are passed along adjacent to the ground surface overlying the submerged or buried pipeline, and thereby quickly and easily pin point the actual defect location.

It is thus an object of this invention to provide an improved apparatus for inspecting tubular metallic members, such as pipelines, for defects by causing relative movement therewith and wherein the search unit is adapted to be maintained in resilient contact with the surface of the well being inspected, which unit is capable of repeated deformation without fatigue failure.

It is another object of this invention to provide an improved apparatus for detecting defects in a tubular member, such as pipe, wherein a magnetic field is established in the pipe with a minimum of power and wherein magnetic flux diffusion in a transverse direction is greatly reduced.

A further objective of this invention is to provide an improved apparatus for inspecting pipe for defects, wherein the magnetic field is established with a minimum of power and in which the pick-up coil for detecting the defects is capable of repeated deformations without fatigue failure.

Yet another object of this invention is to provide an apparatus and method for testing buried or submerged pipeline from the inside for defects and to mark those defects, so that they may be detected from above the ground surface.

These and other objectives will be evident by the description hereinafter and by reference to the drawings wherein like numerals refer to like structures and in which.

Figure 1:
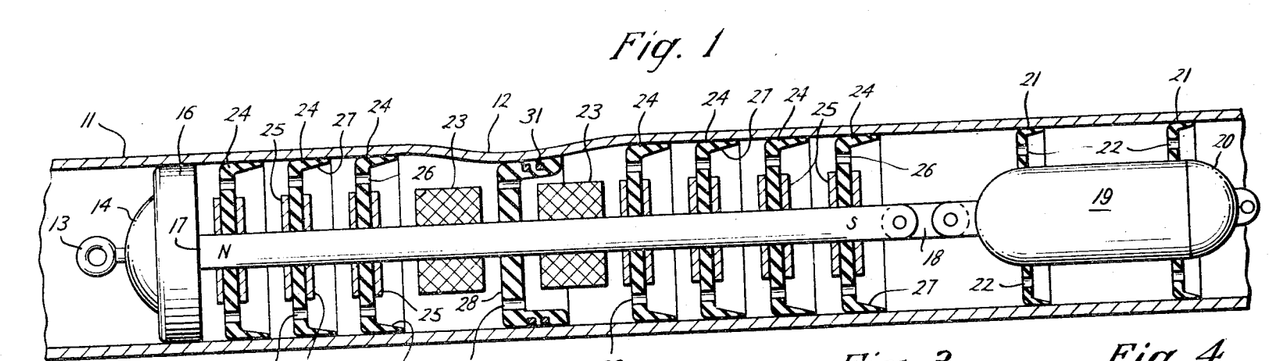
FIG. 1 is in part a central sectional view of one embodiment of this invention as it would appear in passing through a pipeline and is in part a side elevation view.

Referring to FIG. 1, there is generally shown one embodiment of the instant invention in the form of a pipeline inspection pig for passing through a pipeline by the application of pressurized liquid. The inspection pig is shown positioned in pipe 11 which pipe is shown with an internal restriction in the form of mash of dent 12.

Starting with the leading end of the pig, there is lifting eye 13 which is of standard design and customary on all pips, such as those that are used for cleaning pipelines. Eye 13 is secured to an annular dome shaped nose cone 14 which is attached to an annular driving cup 16 made of a resilient elastomeric material such as rubber or plastic. Cup 16 is shaped to resiliently contact the internal surface of pipe 11 when liquid pressure is applied thereto in much the same manner as a piston is driven in a cylinder by expanding gas.

Cup 16 is secured to the forward end of an annular elongated magnetic body member or magnetic core 17. Hence, cup 16 not only serves the purpose of driving the pig through the pipeline, but helps to centrally support and position core 17 and other members associated therewith.

Magnetic core 17 is used to establish a magnetic field in pipe 11, as will be explained hereinafter, hence the cross-section of core 17 is of a slightly greater area than the cross-section of pipe 11 in order to saturate pipe 11 and allow for some flux leakage, or alternatively, core 17 must be made of magnetic material having a higher permeability than that of the pipe being inspected. Thus, if pipe 11 and core 17 were of the same material, and if pipe 11 were 50 pounds per foot, then core 17 would have to be on the order of 60–75 pounds per foot.

The rear end of core 17 is provided with universal joint 18 containing electrical connectors (not shown), connecting the fore portion of the apparatus to instrument package 19, which is centrally positioned and supported in pipe 11 by a pair of spaced apart annular resilent elastomeric support cups 21, having fluid by-pass apertures 22 therethrough. Instrument package 19 contains batteries for a magnetizing power source and for operating electrical detection means such as a magnetic tape recorder for recording defects detected, oscillators and other electronic devices normally used in pig search tool of this general type. The rear end of package 19 is provided with rear access cone cover 20 which is removable to provide access to the batteries etc., contained in package 19.

Reference is again made to a magnetizing means of the apparatus which generally includes core 17 and certain elements mounted thereon. Core 17 is shown as an electromagnet having annular solenoid coils 23 mounted thereon and energized by batteries in package 19, which coils provide magnetism for establishing a magnetic field in pipe 11.

Magnetic core 17 has a north pole marked N and a south pole marked S. Adjacent to each pole is mounted an annular resilient magnetizing member (or members), conveniently shown in the form of a plurality of magnetically conductive disks 24 of an elastomeric material such as rubber, plastic or the like. Examples of a magnetically conductive material which would be suitable for disks 24 would be a mixture of neoprene or other oil resistant elastomers mixed with a very high content of iron oxide or iron powder. One operable mixture would be in about the ratio of 1 part elastomer to 4 parts iron oxide or iron powder by weight.

Disks 24 are annular in shape and are of a size to resiliently contact the full 360° internal circumference of pipe 11. They are each supported by a pair of annular support disks 25 of a more rigid material, such as aluminum to give some rigidity to disks 24, but not to prevent disks 24 from deforming when passing an internal obstruction. Since disks 24 have a high magnetic permeability and are resilient, the air gap between their outer circumferential or peripheral surface and the internal surface of pipe 11 is reduced to zero, thus largely preventing high reluctance air gaps and wasting of power. Since disks 24 are resilient and collapsible, the pig will negotiate pipe turns, normal mashes, protrusions in the pipe caused by field welds, backing rings, valves and the like.

Each of the disks 24 are provided with by-pass ports 26 therethrough, except for the leading disk, which may optionally not have such ports. The purpose of ports 26 is to admit passage of a driving liquid to cup 16, so that the apparatus will be propelled through pipe 11 by hydraulic pressure on cup 16 at the front of the tool.

Disks 24 are shown having a concave rear or trailing edge, thus forming annular tapered surfaces 27. When the pig is passed through pipe 11 by fluid pressure, the fluid is forced through ports 26 and may at the same time, exert some pressure against the rear or trailing surface of disks 24 and against tapered surfaces 27, whereby the outside surfaces of disks 24 are urged into closer contact with pipe 11.

The search unit of the apparatus is conveniently shown as annular body member 28 mounted on core 17 at about midpoint thereof. Body member 28 in this embodiment is in the shape of an annular cup and is an electrically nonconductive, non-magnetic, elastomeric material, such as rubber, and is shaped to resiliently contact the full internal circumferential surface of pipe 11.

Body member 28 is provided with a by-pass ports 29, similar to ports 26 in disks 24.

Embedded just under the outside circumferential or peripheral surface of body member 21 is electrically conductive annular coil 31 of an extensible and resilient material, such as a conductive elastomer. Another example of a coil which may be optionally used would be a rubber tube filled with mercury. Coil 31 is shown as being made from conductive rubber and is shaped much like a narrow rubber band. Coil 31 may conveniently be formed in body member 28 by first forming body member 28 with a helical groove around the outside surface. The band of electrically conductive rubber is then placed in the groove forming a coil. A thin layer of flexible non-magnetic, electrically non-conductive material, such as rubber, is then placed over the coils, and the entire assembly vulcanized together, with coil 31 being connected to appropriate leads.

Conductive elastomers which may be used for making coil 31 are currently being manufactured by the industry wherein the relative resistivity is as low as 100 ohm-cm. A good treatise setting forth methods of making conductive elastomers is: Conductive Rubber, Its Production, Application and Test Methods, by R. H. Norman, McClaren and Sons, Ltd., McClaren House, 131 Great Suffolk St., London, S.E.I. First Impression 1957, Second Impression 1959.

Coil 31 is connected to instrument package 19 by appropriate leads (not shown) so that any voltages induced in coil 31 may be recorded.

The axial length of body member 28 is exaggerated as shown in FIG. 1 for purposes of illustration. In actual practice, each turn of coil 31 may be spaced only .025 inch apart axially. The shorter the axial length of coil 31, the smaller will be the defect which the coil can detect.

Figure 2:
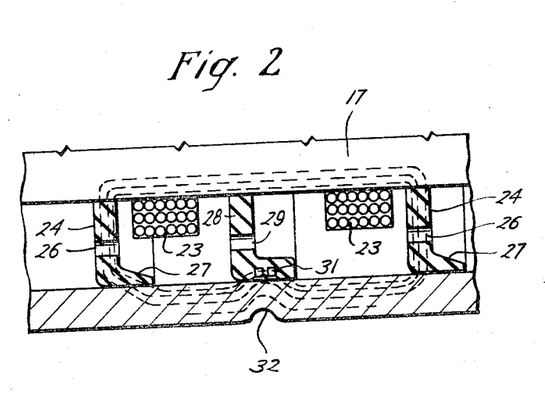
FIG. 2 is a fragmentary enlarged view of the magnetic-responsive means shown in FIG. 1, with lines of magnetic flux superposed thereon.
Figure 3:
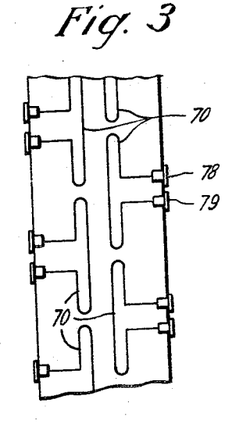
FIG. 3 is a diagrammatic laid out plan view illustration of the magnetic-responsive coils of one embodiment of this invention.

In operation, the apparatus shown in FIG. 1 would be placed in a pipe and forced therethrough by the application of fluid from the rear. Coils 23 would be energized by a power source contained in instrument package 19. The full circumference of a section of pipe 11 is thereby magnetized with a magnetic field having unidirectional longitudinal flux lines extending therethrough. The pattern of these flux lines is illustratively shown in FIG. 2, which is an enlarged fragmental view of FIG. 1. It will be observed that there is flux leakage caused by outside defect 32, which flux leakage will cause a variation in induced voltage in coil 31. Since coil 31 is connected to recording means in instrument package 19, the variations in voltages induced in coil 31 can be recorded as indications of defects in pipe 11. Hence, as the pig travels through the pipeline, a continuous record may be made of defects detected by coil 31. The recording means contained in instrument package 19 are conventional and well-known in the art, such as that shown in FIGS. 16 and 17 of U.S. Patent No. 2,908,085 issued to Price et al. on Oct. 13, 1959.

Figure 9:
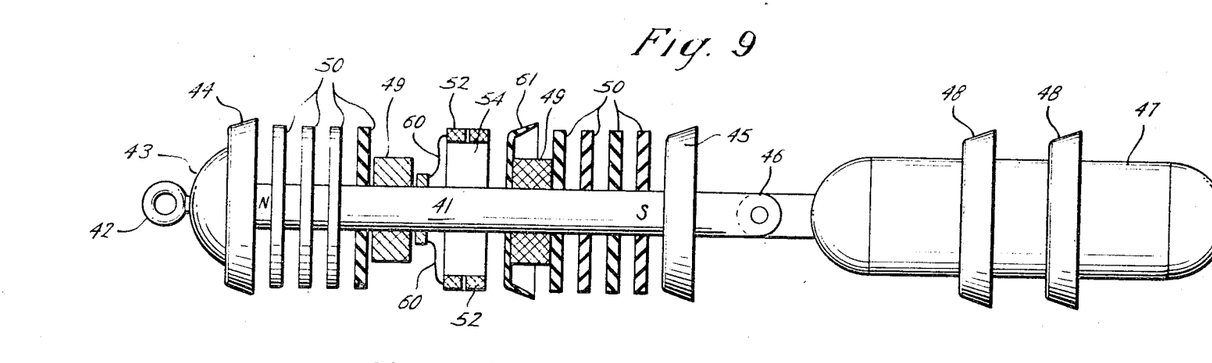
FIG. 9 is in part a central sectional view of another embodiment of this invention showing both a magnetizing means and a magnetic-responsive means being passed through a pipe and in part a side elevation view.

FIG. 9 shows another embodiment of the resilient magnetizing means of this invention together with a magnetic-responsive means or search unit which is shown also as being resilient, but which may be rigid if its diameter is reduced to clear internal pipe obstructions. More specifically, the apparatus shown in FIG. 9 has lifting eye 42 connected to annular convex nose cone 43 which is secured to annular frusto-conical shaped driving cup 44 attached to the fore end of magnetic core 41. Hence, cup 44 not only provides part of the driving means but also centrally supports the fore part of the apparatus.

The rear or trailing end of core 41 has annular support cup 45 secured thereto for centrally positioning the apparatus. The rear tip of core 41 is provided with universal joint 46, to which is secured instrument package 47, which is supported by annular support cups 48. Instrument package 47 contains electrical detection means, such as a tape recorder which is connected to coils 52.

Core 41 may be a permanent magnet, but preferably is an electromagnet, hence annular energizing coils 49 are spaced apart on core 41 and attached (by means not shown) to a power source in instrument package 47.

The foregoing portions of the apparatus shown in FIG. 9 are similar to portions of the apparatus shown in FIG. 1 and operate in a similar fashion. However, in the FIG. 9 apparatus, the resilient magnetically conductive members mounted on core 41 take a somewhat different form. In this case, there are four annular resilient magnetically conductive disks 50 made of an elastomeric material and secured to core 41 adjacent the north end thereof and four similar disks 50 secured adjacent the south end. The disks 50 are flat annular members, shaped to resiliently contact the internal surface of the pipe being inspected, and are for conducting magnetic flux between core 41 and the pipe being inspected. Disks 50 may be made of the same material as disks 24 shown in FIG. 1. An additional support cup 61, similar to cups 48 is provided near the center of core 41 and is optional.

Since disks 50 resiliently contact the pipe being inspected the air gap between the magnetizing means and the pipe is reduced to practically zero, hence less power is required than with non-contacting magnetizing means. By being resilient, disks 50 will pass over obstructions and turns and can stand repeated deformations without excessive fatigue wear.

Furthermore, magnetism is conducted to the full circumference of the wall of the pipe being inspected. This is best shown by reference to FIG. 10, which is a laid out plan view of the external surface of the apparatus shown in FIG. 9, with the flux pattern that would be established in the inspected pipe superimposed thereon. Hence, contacting surfaces 51 of disks 50 are shown spaced on either side of magnetic-responsive means in the form of a plurality of connected coils 52, the operation of which coils will be explained hereinafter.

Figure 10:
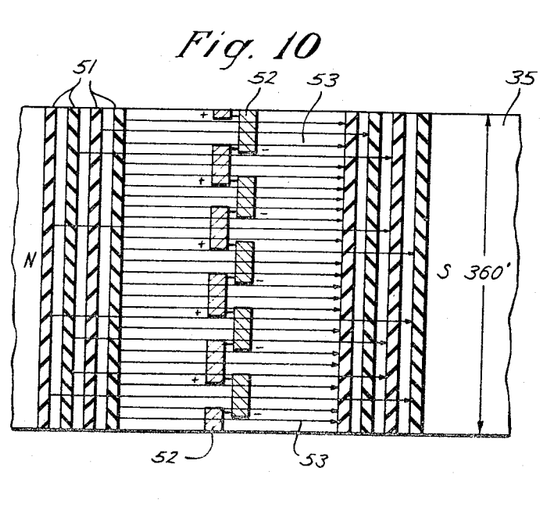
FIG. 10 is a laid out plan view of the full circumference of the external surface of the apparatus shown in FIG. 9 as it would contact the internal surface of the pipe, with representative magnetic flux lines superposed thereon.
Figure 11:
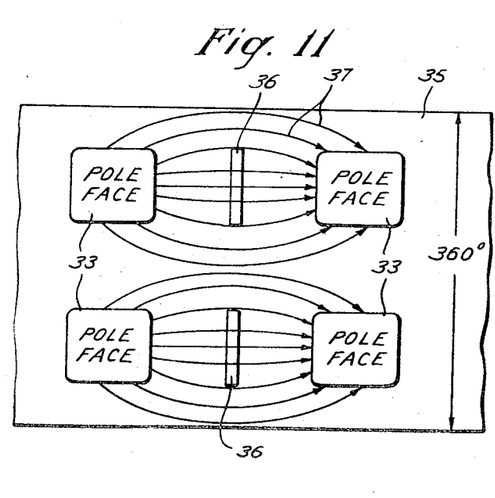
FIG. 11 is a view similar to FIG. 10 showing how certain prior art devices operate in relation to the present invention.

Referring now to the contacting surfaces 51, it will be observed that flux passes from the north pole of magnetic core 41 to the south pole by passing through the pipe being inspected. In so doing, the flux does not fan out in a transverse direction (as shown in FIG. 11) but rather the flux follows straight lines, indicated by arrows 53. This is the same type of flux pattern that is established in pipe 11 by disks 24 shown in FIG. 1. Since there is no fanning out of the flux, less power is required to magnetically saturate the pipe to the desired level so that the magnetic-responsive means can operate effectively in detecting defects.

The advantages of the resilient magnetizing means, in the form of disks 24 or disks 50, is best shown by comparing FIGS. 10 and 11. FIG. 10 shows a laid out plan view of the full circumference of the external surface of a portion of the apparatus shown in FIG. 9, and shows how magnetic flux is transmitted to the pipe being inspected. FIG. 11 is a similar view of certain prior art apparatuses. In FIG. 11, where two magnets are used, each having two pole faces, magnetic flux passes through pipe 35 from one pole face to another. Each magnet has a magnetic responsive means 36 spaced between its pole faces. In this instance, the magnetic flux, indicated by arrows 37 do not run straight from one pole to the other, but fan out in a transverse direction causing a reduction in flux density in the pipe wall adjacent to magnetic-responsive means 36, hence necessitating very high power requirements to magnetically saturate the area adjacent to means 36. This may be very impractical in the case of pigs which may have to span many miles of pipe and cannot be connected with an outside power source by cable means.

The fanning out of the flux as shown in FIG. 11 is caused by each magnet covering only about 100° of the circumference of the pipe. Therefore, when two magnets are operated in the same section of pipe, flux is actually supplied to 360° of pipe, even though the magnets themselves are limited to a combined 200° or so.

FIG. 10 shows that with the magnetizing means of the present invention substantially the full circumference of pipe 35 is provided with magnetic flux. Hence, the flux lines are straight with no fanning out.

Referring again to FIG. 9, search unit 54 is an annular member mounted upon core 41 at about midpoint between the north and south poles thereof. Unit 54 is shown as being resilient with a plurality of search coils 52 connected around its outside circumference. Coils 52 are made of conductive rubber and provided with a thin electrically non-conductive, non-magnetic covering and are urged into slidable and resilient contact with the internal surface of pipe being inspected. Further, coils 52 are connected together in series opposed as shown in FIG. 10 and are connected to recording means in instrument package 47 by leads 60.

In operation, the apparatus of FIG. 9 will be propelled through the pipe being inspected by liquid pressure. A longitudinal magnetic field will be established in the pipe, which field will be as shown in FIG. 10. When coils 52 pass over a defect in the pipe, an electrical voltage will be induced therein, which voltage will be recorded as an indication of a defect. The operation of rigid coils shaped such as coils 52 is old in the art and is more fully explained in United States Patent No. 2,746,012. However, since coils 52 will be subjected to repeated deformation, they should be of the same resilient conductive material as that used in coil 31 in FIG. 1.

Alternatively, search unit 54 of FIG. 9 could be a rigid non-contacting member in which case the diameter thereof would be reduced sufficiently to pass internal obstructions, turns and the like. When this is done, coils 52 could be of copper wire or the like, or other magnetic-responsive means could be used, as for example, magnetometers such as those shown in United States Patents 2,758,276 or 2,770,773. When using a non-contacting search unit, detection and resolution of defects might not be as definitive as with a contacting search unit, but when employed with the contacting and resilient magnetizing disks of this invention, there is still a great improvement in detection and resolution over prior art apparatuses.

While the apparatus shown in FIGS. 1 and 9 have been described as pigs for use in pipelines, they are easily adaptable for use in downhole well operations or for inspecting lengths of pipe. Referring to FIG. 1, if driving cup 16 and leading disk 24 were provided with ports similar to ports 26 in the other disks 24, then the apparatus could be lowered in a well casing by a wire line secured to eye 13. When the tool reached the desired depth, coils 23 could be energized and the casing inspected by lifting upward on the wire line and thereby causing the apparatus to move through the casing and inspect it just as a pipeline is inspected. Similarly, the apparatus could be drawn through a length of pipe. The tool of FIG. 9 could likewise be adapted to similar uses.

The foregoing has generally described the resilient magnetizing means of the invention and certain embodiments, alternatives and advantages thereof. The resilient search unit of this invention will now be described in greater detail.

As previously explained, the search unit shown in FIG. 1 is comprised of body member 28 made of an electrically non-conductive, non-magnetic, elastomeric material, such as rubber or a polymer, and is shaped to resiliently contact the internal surface of pipe 11. An electrically conductive annular coil 31 of extensible and resilient material, such as an electrically conductive elastomer, is embedded just under the circumferential or peripheral surface of body member 28 such that a thin layer of flexible, non-magnetic, electrically non-conductive material (such as rubber) overlays coil 31 and secures it from contact with pipe 11, yet permits coil 31 to be resiliently held very close thereto. It is to be understood that this overlaying layer may be of a different material than the body member so long as it is flexible, non-magnetic, and electrically non-conductive, but for purposes of convenience, the coil will still be described as being embedded just under the surface of the body member. The advantages of such a search unit includes the fact that the air gap between the search coil and the pipe is reduced to a minimum and at the same time, the unit can pass through a pipe without being stopped by minor obstructions. Furthermore, since coil 31 is extensible and resilient, it can be subjected to repeated deformations without becoming fatigued, as would a coil of copper wire, which would soon fatigue and break if subjected to such repeated deformations. Hence, the resilient and extensible nature of coil 31 is one of the important features of the novel search unit of this invention. It is to be understood that a tube of mercury enclosed in a rubber tube is considered to be a resilient and extensible material as is a coil of conductive elastomeric material, but the latter is preferred because of its greater versatility in forming various coil configurations and because of less danger of puncturing and malfunctioning.

Figure 8:
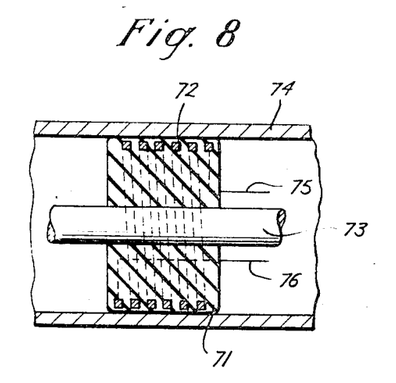

The magnetic-responsive means of the search unit of this invention can take many other forms. Referring to FIG. 8, annular body member 71 is shown having a coil 72 with a plurality of turns. In this instance body member 71 is an annular disk of rubber mounted on magnetic core 73 and is of a size to resiliently contact the internal surface of pipe 74. Coil 72 is connected to a recording means by leads 75 and 76. Coil 72 is made of conductive rubber and is embedded just under the external surface of body member 71. In practice, body member 71 would only be perhaps an inch thick in an axial direction, and hence the turns of coil 72 would be closely spaced. This search unit is very similar to that shown in FIG. 1, but the coil has a greater number of turns. More specifically, coil 72 may be made of a strand of conductive rubber which is only $\frac{1}{64}$ inch in diameter and each turn thereof axially spaced apart only $\frac{1}{64}$ inch, and may be buried only $\frac{1}{32}$ inch below the circumferential or peripheral surface of body member 71.

Figure 6:
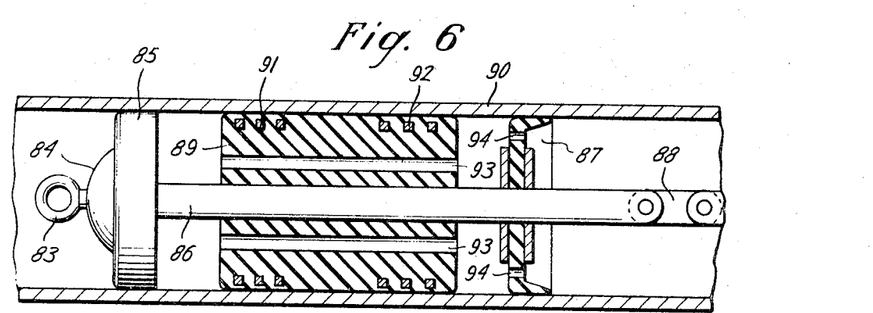
FIG. 6 is a central sectional view of still another view of another embodiment of the magnetic-responsive means of this invention shown passing through a tubular member.

The search unit of FIG. 6 is comprised of an annular body member 89 made of rubber or other electrically non-conductive, non-magnetic, elastomeric material and is shaped to resiliently contact the internal surface of pipe 90. Annular coils 91 and 92 are embedded in member 89, just under the outside or peripheral surface thereof. Coils 91 and 92 are separately connected to recording means (not shown) in the instrument package of the apparatus. Coils 91 and 92 are made of an electrically conductive, extensible and resilient material, such as conductive rubber. With this arrangement of coils 91 and 92, an eddy current testing technique can be used with the magnetic field being established by one coil, for example coil 91, and with coil 92 being responsive to changes in eddy current as indications of defects encountered. This eddy current technique is taught, for example, in U.S. Patent No. 3,075,144.

Alternatively, a third resilient and extensible coil could be spaced between coils 91 and 92, in which case the added coil could be a receiving coil and coils 91 and 92 the existing coils, using a technique such as that taught in U.S. Patent No. 2,104,643 or coils 91 and 92 could be connected in series opposed and used as the receiving coils and the added coil being the exciting coil using an inspection method such as that taught in U.S. Patent No. 2,215,605 or 2,315,943.

In practice, the axial length of member 89 would only be about one inch long, thus making it possible to detect very small defects. The apparatus would be propelled through a pipeline the same as the pigs of FIGS. 1 and 9. Further, member 89 may optionally be provided with axial ports 93 and support 87 with ports 94 to permit passage of fluid to cup 85.

Figure 4:
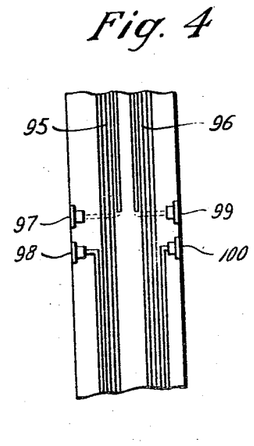
FIG. 4 is another diagrammatic laid out plan view illustration of another embodiment of the magnetic-responsive means of this invention.

FIG. 4 shows an illustrative fragmentary laid out plan view of the outside surface of a search unit similar to member 89 of FIG. 6. In this case, there are two spaced apart coils 95 and 96, with leads 97–98 and 99–100 respectively, for connection to appropriate recording means. Each of the coils 95 and 96 has three turns but may have an appropriate number. One coil may be connected to a power source to have an electrical votlage thereon, whereby eddy currents are established and the other coil will, of course, have voltages induced therein as an incident of the eddy currents.

Alternatively, a balanced bridge circuit could be used in connection with coils 95 and 96, such as that shown in 2,540,588.

Figure 7:
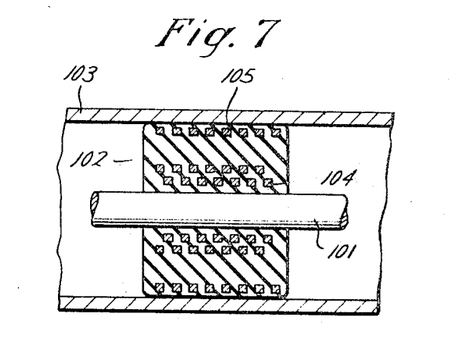
FIGS. 7 and 8 are both central sectional views of additional magnetic-responsive embodiments of the invention shown on the inside of pipes being inspected.

FIG. 7 shows an apparatus similar to that in FIG. 6 with body member 102 being of rubber and mounted on rod 101. Member 102 in practice would only be about one inch in axial length and would resiliently contact the inside surface of pipe 103. In this embodiment, there are two coils embedded in body member 102. First, there is a large coil 104 of conductive rubber embedded axially inwardly and away from the outside circumferential surface and a smaller coil 105 of conductive rubber positioned just under the outside surface of body member 102. Both coils are provided with leads for connection to appropriate recording means. In operation of this embodiment, an eddy current technique can be used, with coil 104 being the energized coil and coil 105 being the coil in which voltages are induced. As body member 102 is moved relatively through pipe 103, defects would be detected by coil 105. Hence, it may be said that coil 105 is an electrically conductive coil of extensible and resilient material embedded just under the surface of a resilient body member of a search unit.

Figure 5:
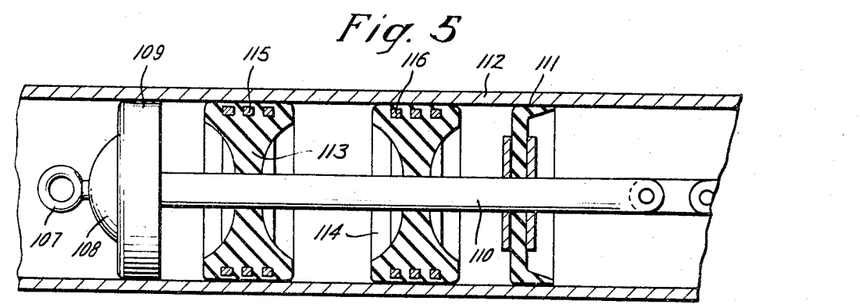
FIG. 5 is a central sectional view of another embodiment of the magnetic-responsive means of this invention as it would appear in inspecting a pipe from the inside.

FIG. 5 shows another embodiment of the invention similar to that in FIG. 6. Again, there is a pig with lifting eye 107, secured to nose cone 108, attached to annular driving disk 109 which is connected to the fore end of rod 110 which in turn is supported at its rearward end by disk 111; all positioned within pipe 112. In this embodiment, there are two resilient annular body members 113 and 114 mounted on rod 110. Each of the body members 113 and 114 has a concave leading and trailing surfaces, and are of a non-magnetic, electrically non-conductive material, such as rubber, and are of a size to resiliently contact the inside of pipe 112.

Member 113 has a coil 115 of conductive rubber embedded just under the annular surface, which coil acts as the pickup coil and in which voltages are induced by eddy current established in pipe 112 by coil 116 (which may also be referred to as the magnetizing means) embedded just under the annular surface of member 114. In this case coil 116 is also made of a conductive rubber and is connected to a power source. The operation of this apparatus would be similar to that of FIG. 6 and an eddy current technique may be used in connection therewith, such as that described above. Alternatively, a balanced bridge circuit, also described above, could be connected to coils 115 and 116.

Another novel feaeure of the present invention relates to method and apparatus for inspecting buried pipelines from the inside and establishing a large magnetic pole point in the pipe at those points where a significant discontinuity or defect is detected, which pole point can subsequently be detected from above ground by passing a magnetic-responsive means along adjacent to the ground surface above the pipeline. In prior art inspection devices, defects might be detected in a pipeline and recorded on a magnetic tape. However, it was very difficult to correlate the location on the recording tape with the actual physical location. Accordingly, the present invention overcomes this difficulty.

Figure 16:
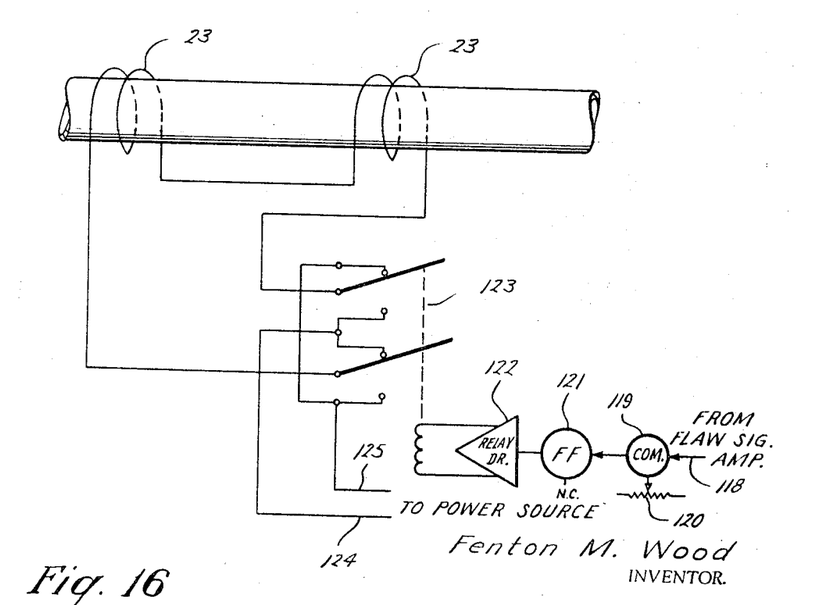
FIG. 16 is a block diagram of one embodiment of the electrical circuit of that portion of the invention which relates to establishing magnetic pole points in submerged pipe as indications of defects in the pipe.

Referring to FIG. 16, there is shown a block diagram of an electrical circuit which could be used in connection with certain embodiments of this invention to establish the aforesaid pole points. This circuit will be described as an addition to the previously described apparatus of FIG. 1, but it is to be understood that it could be incorporated with other embodiments.

In the operation of the apparatus of FIG. 1, coil 31 thereof will detect defects since a voltage response is induced therein by stray flux emanating from a defect. This voltage or defect signal is transmitted to recording means in instrument package 19. This defect signal is then applied to an amplifier (not shown) and thence to lead 118 shown in FIG. 16, where the defect signal is applied to comparator 119, which is set to a preselected level by potentiometer 120. When the size of the defect, and hence the size of the defect signal, is above the preselected level, comparator 119 will transmit a signal to symmetrically triggered flip-flop 121.

Comparator 119 is of the Schmitt trigger type such as that shown in Military Standardization Handbook 215, Selected Semiconductor Circuits, Dept. of Defense, U.S.A. June 15, 1960, Circuit 6–18, p. 6–63.

Flip-flop 121 is a multivibrator having two stable states and is connected to a separate power source. A signal received from comparator 119 acts as a trigger to change flip-flop 121 from one state to the other. An example of the circuit arrangement of flip-flop 121 is set forth in FIGS. 5–15, p. 163, Pulse and Digital Circuits by Millman and Taub, McGraw-Hill Book Co., Inc., New York, 1956.

One output of flip-flop 121 is applied to relay driver 122 and the other output has no connection indicated by N.C. When an output is applied to driver 122, double throw relay switch 123 is closed. When switch 123 is in the position shown in FIG. 16, electrical power will be supplied to magnetizing coils 23, 23 over leads 124 and 125 in one direction. When switch 123 is closed and electrical current is supplied to coils 23, 23 over leads 124 and 125 in the opposite direction. The result will be that electrical current will flow through coils 23, 23 in one direction when relay driver 122 is activated and in the opposite direction when driver 122 is not activated, hence the magnetic polarity of the magnetic field established by coils 23, 23 will be reversed, thereby establishing a large detectable pole point in the pipe being inspected.

Since coils 23, 23 will be substantially saturating pipe 11 with unidirectional magnetic flux and the magnetic polarity will be reversed when a defect above a preselected level is detected, a magnetic pole point will be established in pipe 11. If this pipe is buried, this pole point will be of sufficient intensity that it can subsequently be detected from above ground by passing a magnetic-responsive means, such as a flux gate magnetometer, along the ground above the pipeline. Hence, the physical location of serious defects can quickly be determined.

While the foregoing description of the invention has been described in relation to an apparatus for inspecting the pipe from the inside, the invention is also admissible of use for inspecting pipe or other elongate metallic members from the outside.

Figure 15:
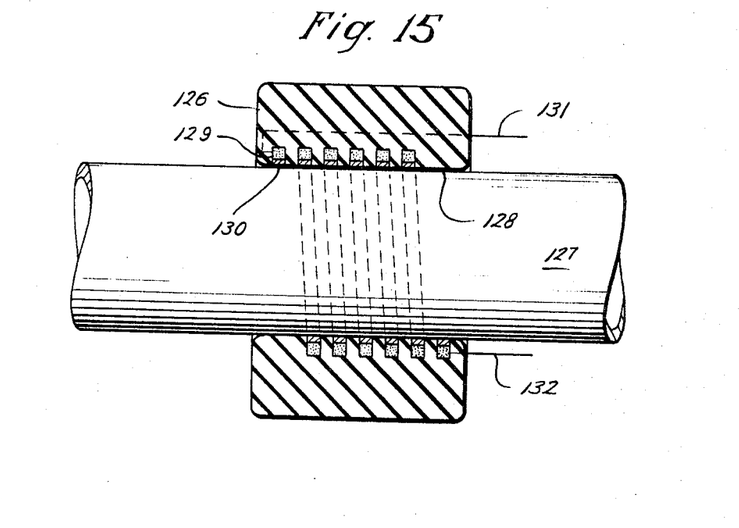

FIG. 15 shows a resilient search unit for use with an apparatus for inspecting pipe from the outside. This search unit is comparable with that shown in FIG. 8, except that it is adapted for outside inspection. In this instance, the search unit is comprised of an annular body member or ring 126 of electrically non-conductive, non-magnetic, elastomeric material, such as rubber, and is shaped with an axial annular opening through which pipe 127 may be inserted and moved in an axial direction. The annular opening in ring 126 is of a size such that internal surface 128 thereof will resiliently contact the outside circumferential surface of pipe 127. Electrically conductive coil 129 of extensible and resilient material, such as conductive rubber, is embedded just under internal annular surface 128, and a thin layer 130 of flexible, non-magnetic, electrically non-conductive material, such as rubber, is placed over coil 129 so that coil 129 is secured from contact with pipe 127. Hence, coil 129 is resiliently maintained in very close proximity to pipe 127 during relative axial movement therewith.

Coil 129 is connected by leads 131 and 132 to conventional recording means.

In operation, pipe 127 would be provided with a longitudinal magnetic field passing through that portion of pipe 127 that was adjacent ring 126. This magnetic field could be established either by conventional means old in the art, such as by non-contacting magnetizing coils, or it may be established by resilient magnetically conductive annular rings made of material like that of disks 24 in FIG. 1. Relative axial movement of ring 126 and pipe 127 would then be effected so that any flux leakage caused by defects in pipe 127 would induce a voltage response in coil 129. Since coil 129 is resiliently maintained in very close proximity to pipe 127, it will readily pass over bumps and the like, but will permit more accurate detection than has heretofore been possible. In practice, the axial length of ring 126 may be less than one inch, thus making it possible to detect very small defects.

Figure 12:
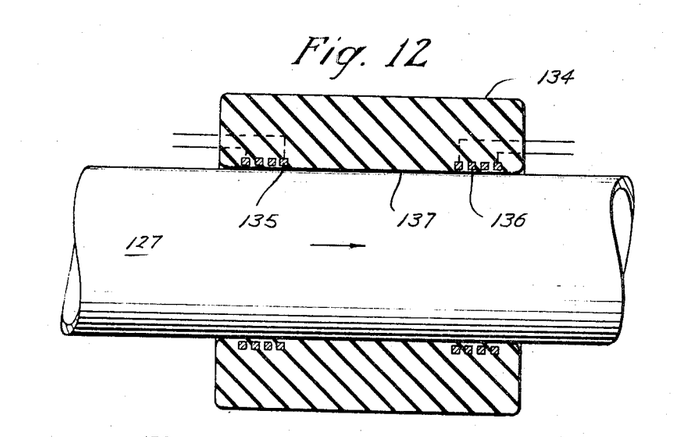
FIGS. 12–15 are central sectional views of various embodiments of the magnetic-responsive means used to inspect pipe from the outside.

FIG. 12 shows a search unit for use with an outside inspection device which compares with the inside device shown in FIG. 6. Annular ring 134 is similar to ring 126 shown in FIG. 15, and is of the same material and shaped to resiliently contact the outside surface of pipe 127. In this instance, two spaced apart coils are embedded just under internal contacting surface 137. With this search unit, an eddy current technique could be employed wherein coil 136 could be connected to a power source to establish a magnetic field (eddy current) in pipe 127 and coil 135 could be used as the inductance pickup coil as is well known to those skilled in the art. Hence, defects would be detected by coil 135. Alternatively, a balanced bridge eddy current system, such as that described above could be used.

Figure 13:
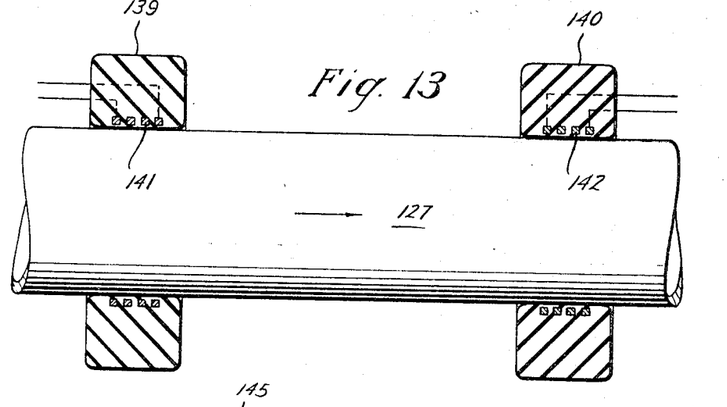

FIG. 13 shows another embodiment of an outside search unit that is similar to FIG. 12, but wherein two separate body members 139 and 140 each shaped with an axial opening through which pipe 127 is moved axially in a slidable and resiliently contacting manner. Conductive rubber coils 141 and 142 are embedded respectively in body member 139 and 140 just as coils 135 and 136 were embedded in ring 134 of FIG. 12 and are operated in a similar manner.

Figure 14:
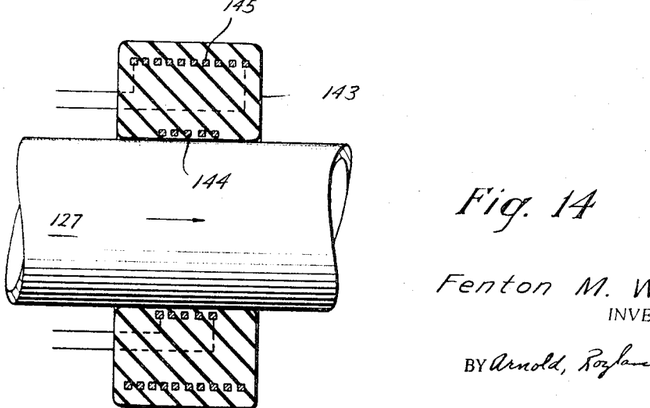

FIG. 14 shows another embodiment of an outside search unit this is comparable to the inside unit shown in FIG. 7. In this case, there is annular ring 143 made of rubber with an axial opening through which pipe 127 may be moved relatively in a resiliently contacting relationship. Pickup or detecting coil 144 is of a conductive rubber and is embedded just under the internal annular contacting surface of ring 143, while energizing coil 145, which is also of a conductive rubber, is embedded radially outward from coil 144. In operation, coil 145 would be connected to an energizing source to establish a magnetic field in pipe 127 and coil 144 would be used to detect defects. The fact that coil 144 is an annular band of conductive rubber which is resilient and extensible will permit repeated deformation thereof without fatigue wear. Again, the actual axial length of coil 144 is only about one inch.

While the resilient magnetizing means shown in FIGS. 1 and 9, i.e. disks 24 and 50 respectively, have been described as being of a resilient and magnetically conductive material and cores 17 and 41 have been described as magnetic cores, disks 24 and 50 may alternatively be made of resilient permanently magnetized material such as a mixture of elastomer and particles of an alloy of iron, nickel, and cobalt or the like, which alloy is susceptible of being permanently magnetized. In this embodiment, cores 17 and 41 could be made of a magnetically conductive material, such as iron. With this embodiment, the full circumference of a section of the pipe would still be provided with unidirectional longitudinal magnetic field. In any event, whether the magnetizing means of this invention are resilient disks or magnetically conductive material, or are annular resilient magnets, they will be referred to collectively as annular resilient ferromagnetic members.

Moreover, when there are more than one such a annular resilient ferromagnetic member on each end of the core, then each particular member need not contact the full internal circumference, but may have staggered contacting points, such that collectively, the disks on each end of the core contact substantially the full internal surface of the pipe. When they are so staggered, those members which together contact the full circumference will be considered as one annular resilient ferromagnetic member.

Further modifications may be made in the invention as particularly described without departing from the scope of the invention. Accordingly, the foregoing description is to be construed illustratively only and is not to be construed as a limitation upon the invention as defined in the following claims.

What is claimed is:

1. An apparatus for testing tubular metallic members having internal and external circumferential surfaces, said apparatus comprising:
   a resilient search unit comprising
      an annular body member of electrically non-conductive, non-magnetic, elastomeric material shaped to resiliently contact one of said circumferential surfaces,
   an electrically conductive coil of extensible and resilient material embedded just under that surafce of said annular body member that is contacting said metallic member, whereby a thin layer of flexible, non-magnetic, electrically non-conductive material overlies said coil and secures said coil from contact with said metallic member,
   magnetizing means for establishing a magnetic field in said metallic member, comprising
      first and second annular resilient magnetically conductive members spaced axially on opposite sides of said search unit and resiliently engaging said one circumferential surface for conducting magnetic flux of said field to and from said metallic member,
      means for causing movement of said search unit and said magnetically conductive members relative to said metallic member, and
      electrical detection means connected to said coil for indicating defects by said coil.

2. The apparatus as claimed in claim 1 wherein: said extensible and resilient material is an electrically conductive elastomer.

3. The apparatus as claimed in claim 1 wherein:
said annular body member is shaped to resiliently contact the internal circumference of said tubular member and to be propelled therethrough.

4. The apparatus as claimed in claim 1 wherein:
said annular body member has an annular opening therein of a size sufficient to admit the entry of said tubular member therethrough in an axial direction and to resiliently contact the external surface of said tubular member.

5. An apparatus for inspecting ferromagnetic pipe from the inside comprising:
a magnetizing unit for establishing a longitudinal magnetic field through substantially the full circumference of a section of said pipe and comprising
a core, and
at least two axially spaced apart annular resilient ferromagnetic members mounted on said core and of a size to resiliently engage substantially the full internal circumference of said pipe,
magnetic-responsive means axially positioned between said ferromagnetic members for detecting flux leakage from the wall of said pipe,
means for causing relative movement of said core through said pipe,
electrical detection means connected to said magnetic-responsive means for indicating defects detected by said magnetic-responsive means.

6. An apparatus for inspecting tubular ferromagnetic members from the inside for flaws, the combination comprising:
a magnet for magnetizing a cylindrical section of said tubular member and establishing therein a longitudinal magnetic field through substantially the full circumference of said section, said magnet comprising
a magnetic core,
a pair of annular resilient magnetically conductive members axially mounted on said core,
one member of said pair being adjacent one pole of said core and the other member of said pair being adjacent the other pole of said core,
said magnetically conductive members slidably and resiliently engaging and conducting magnetism to and from the full internal circumference of said section,
magnetic-responsive means secured to said core for measuring variations in said magnetic field,
means for causing relative movement of said core through said tubular member,
electrical detection means connected to said magnetic-responsive means for indicating defects detected by said magnetic-responsive means.

7. An apparatus for inspecting a tubular ferromagnetic member from the inside for flaws, the combination comprising:
a magnet for magnetizing a cylindrical section of said tubular member, said magnet comprising
a magnetic core having a north pole and a south pole,
a first annular resilient magnetically conductive member axially mounted adjacent the north pole of said core, slidably and resiliently engaging and conducting magnetism to the full internal circumference of said section,
a second annular resilient magnetically conductive member axially mounted adjacent the south pole of said core, slidably and resiliently engaging and conducting magnetism from the full internal circumference of said section,
magnetic-responsive means attached to said core at about midpoint between said first and second members for measuring variations in a magnetic field established in said tubular member,
means causing relative movement of said core through said tubular member,
electrical detection means connected to said magnetic-responsive means for indicating defects detected by said magnetic-responsive means.

8. An apparatus for inspecting tubular ferromagnetic members from the inside for flaws, the combination comprising:
a magnet providing the full circumference of a cylindrical section of the wall of said tubular member with a longitudinal magnetic field, and magnet comprising
a magnetic core having reversible north and south poles,
a first annular resilient magnetically conductive member axially mounted adjacent one pole of said core for slidably engaging and conducting magnetism to and from substantially the full internal circumference of said wall,
a second annular resilient magnetically conductive member axially mounted adjacent the other pole of said core for slidably engaging and conducting magnetism to and from substantially the full internal circumference of said wall,
magnetic-responsive means positioned at about midpoint between said first and second members and adjacent the internal surface of said wall for measuring variations in said magnetic field,
means for causing relative movement of said apparatus through said tubular member,
means connected to said magnetic-responsive means for indicating said variations in said magnetic field as flaws in said tubular member, and
means connected to said magnet for reversing the magnetic polarity of said core whenever said magnetic-responsive means encounter a flaw above a predetermined size during said movement through said tubular member.

9. The apparatus as claimed in claim 6 wherein:
said pair of annular resilient magnetically conductive members are of an elastomeric material.

10. An apparatus for inspecting tubular ferromagnetic members from the inside for defects, the combination comprising:
an electromagnet for magnetizing a cylindrical section of said tubular member and establishing therein a longitudinal magnetic field through substantially the full circumference of said section, said magnet comprising
a magnetic core having a north and a south pole,
a first and a second plurality of annular resilient magnetically conductive disks of an elastomeric material, each plurality being monuted on one pole of said core, said disks being of a size to resiliently contact the internal surface of said tubular member and adapted to conduct magnetism to and from the full internal circumference of said section,
magnetic-responsive means positioned between said pluralities of disks for measuring flux leakage from the inside surface of said section,
means for causing relative movement of said core through said tubular member,
electrical detection means connected to said magnetic-responsive means for indicating changes in said flux leakage as defects in said tubular member.

11. The apparatus as claimed in claim 6 wherein:
said magnetic-responsive means includes
an annular body member of electrically non-conductive, non-magnetic, elastomeric material shaped to resiliently contact the internal surface of said tubular member,
an electrically conductive coil of extensible and resilient material embedded just under the external annular surface of said body member, whereby a thin layer of flexible, non-magnetic, electrically non-conductive material overlays said coil.

12. The apparatus as claimed in claim 7, wherein:
said magnetic-responsive means includes
an annular body member of electrically non-conductive, non-magnetic, elastomeric material shaped to resiliently contact the inside surface of said tubular member,
an electrically conductive coil of elastomeric material positioned about the outside annular surface of said annular body member, and
a thin layer of flexible, non-magnetic, electrically non-conductive material overlaying and securing said coil from contact with said tubular member.

13. The apparatus as claimed in claim 8 wherein:
said magnetic-responsive means includes
an annular body member of electrically non-conductive, non-magnetic, elastomeric material shaped to resilient contact the inside surface of said tubular member, and
an electrically conductive coil of elastomeric material embedded in said body member.

14. The apparatus as claimed in claim 10 wherein:
said magnetic-responsive means includes
an annular body member of electrically, non-conductive, non-magnetic, elastomeric material shaped to resiliently contact the inside surface of said tubular member, and
an electrically conductive coil of elastomeric material attached to said body member.

15. The apparatus as claimed in claim 5 wherein:
said annular resilient ferromagnetic members are permanent magnets.

16. An apparatus for inspecting tubular ferromagnetic members from the inside for defects, the combination comprising:
and electromagnet for magnetizing a cylindrical section of said tubular member and establishing therein a longitudinal magnetic field,
a magnetic core having a north and a south pole,
a first and a second plurality of annular resilient magnetically conductive disks of an elastomeric material, each plurality being mounted adjacent one pole of said core, said disks being of a size to resiliently contact the internal surface of said section and adapted to conduct magnetism to and from substantially the full internal circumference of said section,
a magnetic-responsive means positioned at midpoint between said first and second plurality of disks and comprising
an annular body member of electrically non-conductive, non-magnetic, elastomeric material shaped to resiliently contact the full inside circumference of said section,
an electrically conductive coil of elastomeric material embedded just under the outside peripheral surface of said annular body member, whereby a thin layer of flexible, non-magnetic, electrically non-conductive material overlays said coil,
means for propelling said core through said tubular member,
means connected to said coil for indicating changes in flux leakage detected by said coil as indications of flaws in said tubular member, and
means connected to said core for reversing the magnetic polarity of said core whenever said coil detects a defect above a predetermined size during said propelling through said tubular member.

17. The method of inspecting a buried ferromagnetic pipeline from the inside for defects in said pipeline comprising the steps of:
magnetizing the full circumference of a cylindrical section of the wall of said pipeline and establishing therein a magnetic field having unidirectional longitudinal flux lines,
moving said magnetic field through said pipeline in a direction parallel with the longitudinal axis of said pipeline,
detecting changes in flux leakage from said magnetic field in an area closely adjacent the internal surface of said pipeline and about midpoint of the flux lines of said magnetic field and extending around substantially the full internal circumference of said pipeline during said movement, as indications of defects in said pipeline,
reversing the magnetic polarity of said unidirectional flux lines during said movement whenever said changes in flux leakage exceed a predetermined level,
whereby magnetic pole points are established in said pipeline at those places where a significant discontinuity exists in said pipeline, which pole points are subject to detection from the ground surface by other magnetic-responsive means.

18. The method of detecting defects in a buried pipeline comprising the steps of:
magnetizing from the inside the full circumference of a cylindrical section of the wall of said pipeline and establishing therein one magnetic field having unidirectional longitudinal flux lines,
moving said magnetic field through said pipeline in a direction generally parallel with the longitudinal axis of said pipeline,
detecting changes in flux leakage from said wall in an area closely adjacent the internal surface of said pipeline and about midpoint of said flux lines and extending around the full internal circumference of said pipeline during said movement, as indications of flaws in said pipeline,
reversing the magnetic polarity of said unidirectional flux lines during said movement whenever said changes in flux leakage exceed a predetermined level, whereby magnetic pole points are established in said pipeline at those place where a flaw of a predetermined size exists,
detecting said pole points by passing magnetic-responsive means along adjacent the ground surface above said pipeline.

References Cited

UNITED STATES PATENTS

| 2,573,799 | 11/1951 | MacLean. | |
| 2,622,125 | 12/1952 | Bender. | |
| 3,225,293 | 12/1965 | Wood et al. | 324—37 |
| 3,238,448 | 1/1966 | Wood et al. | 324—37 |
| 3,142,796 | 7/1964 | Goldberg et al. | 324—34 |

FOREIGN PATENTS

McMaster, Robert C.: Nondestructive Testing Handbook, New York, The Ronald Press Co., 1963 (copyright, 1959), vol. 2, pp. 38.25–38.26.

RUDOLPH ROLINEC, Primary Examiner.

R. J. CORCORAN, Assistant Examiner.

U.S. Cl. X.R.

324—127